United States Patent [19]

Hirai et al.

[11] Patent Number: 4,550,353
[45] Date of Patent: Oct. 29, 1985

[54] THIN-FILM MAGNETIC HEAD AND METHOD FOR FABRICATING THE SAME

[75] Inventors: Osamu Hirai, Odawara; Tetsuo Kobayashi, Kanagawa; Shunichiro Kuwatsuka, Odawara; Saburo Suzuki, Minamiashigara, all of Japan

[73] Assignee: Computer Basic Technology Research, Tokyo, Japan

[21] Appl. No.: 559,083

[22] Filed: Dec. 7, 1983

[30] Foreign Application Priority Data

Dec. 8, 1982 [JP] Japan .............................. 57-213856

[51] Int. Cl.⁴ ............................................... G11B 5/14
[52] U.S. Cl. .................................... 360/125; 360/126; 360/122; 360/119; 360/127; 29/603; 156/656
[58] Field of Search ............... 360/113, 119, 122, 125, 360/126, 127; 29/603; 156/656, 659.1

[56] References Cited

U.S. PATENT DOCUMENTS 4,239,587 12/1980 Koel et al. .................... 156/659.1
4,295,173 10/1981 Romankiw et al. ................ 360/125

FOREIGN PATENT DOCUMENTS 58-41409 10/1983 Japan ................................ 29/603

Primary Examiner—Stuart N. Hecker
Assistant Examiner—Benjamin E. Urcia
Attorney, Agent, or Firm—Antonelli, Terry & Wands

[57] ABSTRACT

A thin-film magnetic head having a magnetic core of double step structure and a method of fabricating it. A first magnetic core is formed on a substrate, which has a predetermined thickness at a pole chip region thereof and a thickness larger than the predetermined thickness at a back region thereof; a magnetic gap is formed thereon, a conductor coil is formed on the magnetic gap, which is encircled by an inter-layer, insulating film; a first magnetic film is formed thereon, which constitutes one layer of a second magnetic core and is connected with the first magnetic core at the back region; and a second magnetic film is formed thereon through an inorganic insulating film, which constitutes another layer of the second magnetic core and is removed at the pole chip region. When the second magnetic film is removed, the inorganic insulating film serves to protect the first magnetic film, and hence the thickness of the first magnetic film is maintained unvaried. Thus, there is obtained the thin-film magnetic head having a magnetic film which is of a predetermined thickness at the pole chip region and a thickness larger than the predetermined thickness at the back region.

This structure enhances the conversion efficiency of the head as well as boosts the resolution for reproduction and relaxes the magnetization saturation for recording.

26 Claims, 27 Drawing Figures

FIG. IA
PRIOR ART
PROCESS
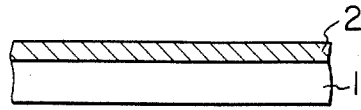
FIG. IB
PRIOR ART
PROCESS
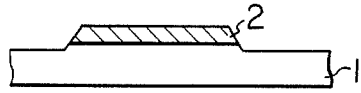
FIG. IC
PRIOR ART
PROCESS
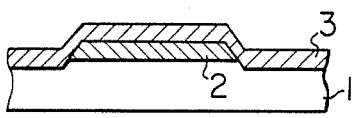
FIG. ID
PRIOR ART
PROCESS
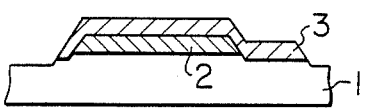
FIG. 2A
PRIOR ART
PROCESS
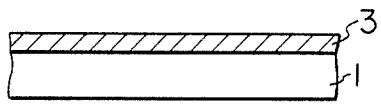
FIG. 2B
PRIOR ART
PROCESS
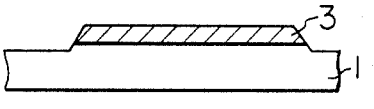
FIG. 2C
PRIOR ART
PROCESS
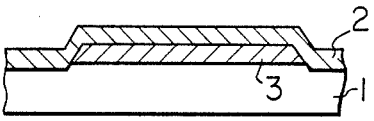
FIG. 2D
PRIOR ART
PROCESS
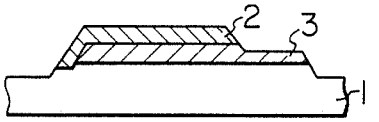

PROCESS

PROCESS

PROCESS

PROCESS

PROCESS

PROCESS

PROCESS

THIN-FILM MAGNETIC HEAD AND METHOD FOR FABRICATING THE SAME

BACKGROUND OF THE INVENTION

This invention relates to a thin-film magnetic head and more particularly to a thin-film magnetic head having a magnetic film with a double step structure, and a method for fabricating the head.

A thin-film magnetic head is commonly fabricated by thin-film forming technique such as a vacuum evaporation or sputtering and a high precision patterning technique called photolithography. Such a common construction of the thin-film magnetic head is described in U.S. Pat. No. 4,219,853. It is described in U.S. Pat. No. 4,190,872 that in such a thin-film magnetic head, in order to enhance the conversion efficiency of the magnetic head as well as to boost resolution for reproducing and to relax a magnetization saturation for recording, the thickness of a magnetic film must be varied at the side of each magnetic core opposed to a recording medium, i.e., a magnetic gap region and a back region of the core succeeding thereto—that is, such a double step structure must be adopted that the thickness of the film in the back region is greater than the thickness of the film in the magnetic gap region.

The magnetic core is ordinarily made by such a technique as vacuum evaporation plating and sputtering. The plating technique is advantageous in that it is relatively easy to form the above-mentioned shape or structure but disadvantageous in that the magnetic performance of the core greatly varies according to a slight variation of a plating condition, the magnetic head performance is not made stable and the control of the thickness of a magnetic film is difficult. On the other hand, the vacuum evaporation or sputtering is advantageous in that less amount of fluctuation in a magnetic film quality occurs and the film thickness is easily controlled in forming the film but disadvantageous in that the precision of film thickness is deteriorated when a stacked film is etched to form a magnetic core of the double step structure mentioned above. In other words, the magnetic core of a double step structure is made by the vacuum evaporation of sputtering through the following three processes such as shown in FIGS. 1A–1D, FIGS. 2A–2D and FIGS. 3A–3C. In the first process shown in FIGS. 1A–1D, a magnetic film 2 stacked on a substrate 1 is patterned to be a predetermined shape through wet or dry etching, a magnetic film 3 is further stacked on the resultant surface and thereafter etched away in a predetermined shape. In the second process shown in FIGS. 2A–2D, the magnetic film 3 is first formed and the magnetic film 2 of the FIGS. 1A–1D is subsequently formed thereon. In the third process shown in FIGS. 3A–3D, a relatively thick magnetic film 5 is stacked on a substrate 4, partially reduced by a predetermined thickness and thereafter etched away in a predetermined shape.

The first process has such a defect that the substrate (or under film), which will be exposed during the progress of etching the magnetic film 2, may be damaged. The fabricating process of a thin film magnetic head using this process is shown in FIGS. 4A–4D. First, as shown in FIG. 4A, a first magnetic film 12 is formed on a substrate 10 and is thereafter patterned in a predetermined shape. A second magnetic film 13 is formed on the first magnetic film 12. A magnetic gap film 14 is formed and thereafter an inter-layer insulating film 15 and a conductor coil 16 are successively formed. The inter-layer insulating film 15 is etched away in a predetermined shape. A first upper magnetic film 17 is formed on the resultant surface. Next, as shown in FIG. 4B, a front area of the first upper magnetic film 17 (magnetic gap area) is etched away by such a dry etching technique ion-milling. A second upper magnetic film 19 is formed on the resultant surface as shown in FIG. 4C. In the last step, the second upper magnetic film 19 is subjected to patterning as shown in FIG. 4D. Thus, there is obtained a thin film magnetic head of such a double step structure that the back region of the magnetic core is thicker than the magnetic gap region. However, in the process there occurs such an inconvenience that the film thickness of the magnetic gap film 14, which must be precisly defined, is caused to be reduced during the step of patterning the upper magnetic film 17 as shown in FIG. 4B. This inconvenience or drawback is remarkable where such a dry etching technique as ion-milling, which can particularly attain high precision etching, is employed. This is because wet etching is a chemical technique while dry etching is generally a physical technique and has a low selectivity of etching.

On the other hand, the second process has a drawback that the exposed portion of the magnetic film 3 will be etched to reduce the thickness thereof during the step of etching the magnetic film 2. The exposed portion of the magnetic film 3 is a portion which requires particularly precise film thickness definition among the portions of the magnetic core. The film thickness variation at this portion results in the fluctuation of the performance of the magnetic head. Further, the third process mentioned above has also the same drawback as the second process.

As described above, it has been conventionally difficult to implement a thin film magnetic head having a magnetic core of such a double step structure as to consist of a magnetic gap region of a given thickness and a back region successive thereto which is thicker than the magnetic gap area with good film thickness precision in the magnetic core and magnetic gap and excellent head performance.

SUMMARY OF THE INVENTION

Accordingly, it is an object of the present invention to provide a thin film magnetic head of such a structure as to obviate the drawbacks entailed in the conventional techniques, and enhance a conversion efficiency of the head as well as to boost a resolution for reproducing and to relax a magnetization saturation for recording, and a method of fabricating the head.

According to one aspect of the present invention, an inorganic insulating film having a slow etching speed is provided between two magnetic film layers constituting a second magnetic core. This inorganic insulating film acts to prevent the film thickness in the magnetic film at a magnetic gap region from being reduced. Therefore, there is obtained a thin-film magnetic head having a magnetic core of such a double step structure as to consist of a magnetic gap region of a given thickness and a back region successive thereto which is thicker than the magnetic gap region with good film thickness precision in the magnetic core and magnetic gap, and excellent head performance.

According to another aspect of the present invention, a magnetic core having such a shape that the back region is thicker than the magnetic gap region can be made with high precision, which enables the core to enhance the conversion efficiency of the head as well as to boost a resolution for reproducing and to relax the magnetization saturation for recording.

Other features and advantages of the invention will be apparent from the following description taken in conjunction with the accompanying drawings.

BRIEF DESCRIPTION OF THE DRAWINGS

FIGS. 1A to 1D, FIGS. 2A to 2D and FIGS. 3A to 3C are longitudinal sectional view which illustrate processes of fabricating a magnetic core on a substrate according to a conventional technique, respectively.

DESCRIPTION OF THE PREFERRED EMBODIMENTS

Figure 6A:
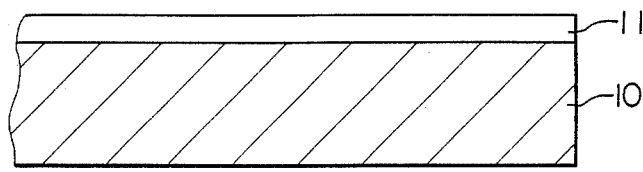
FIGS. 6A to 6J are longitudinal sectional views showing a process of fabricating a thin-film magnetic head in accordance with one embodiment of the invention.
Figure 6B:
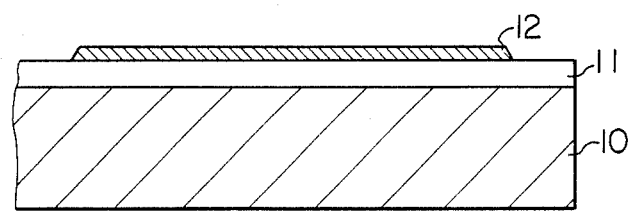
Figure 6C:
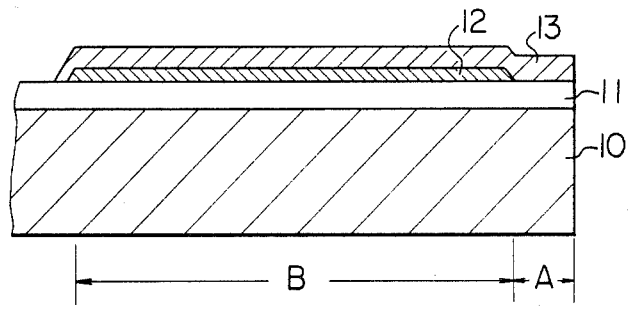
Figure 6D:
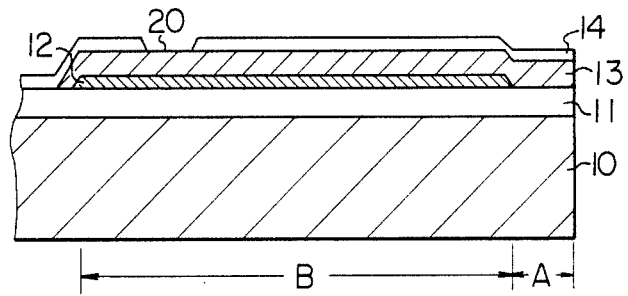
Figure 6E:
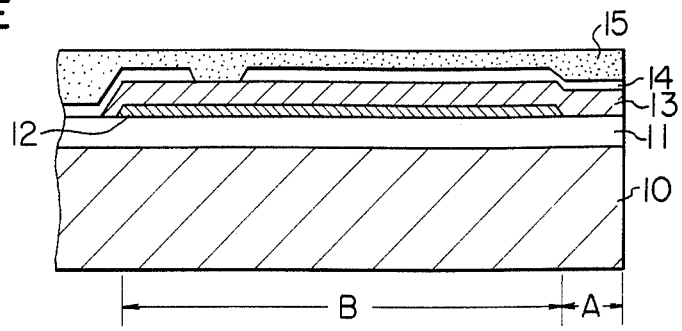
Figure 6F:
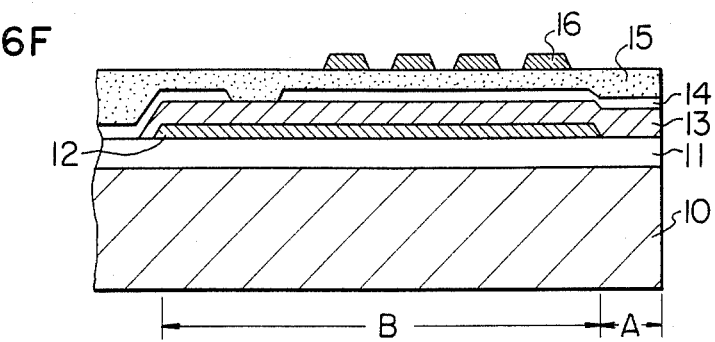
Figure 6G:
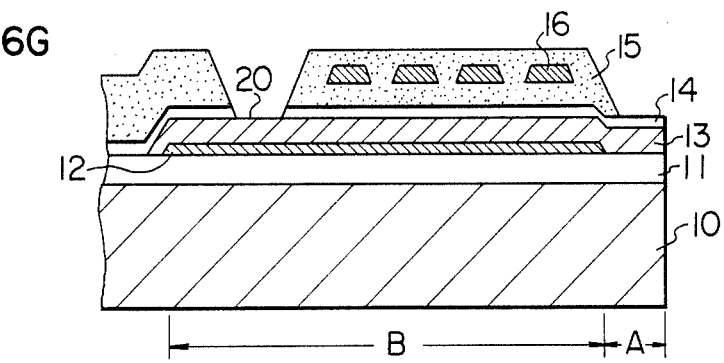
Figure 6H:
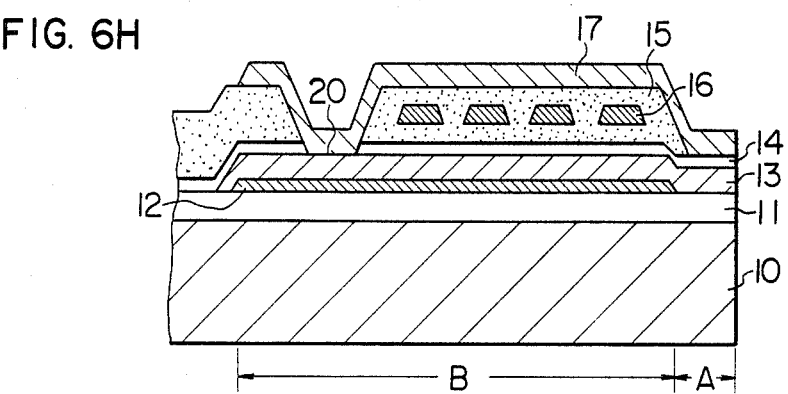
Figure 6I:
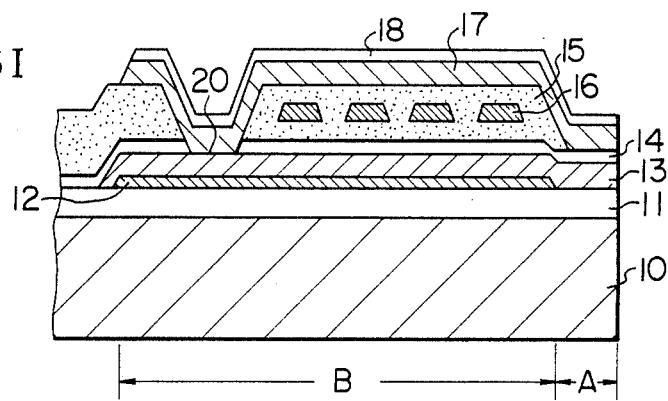
Figure 6J:
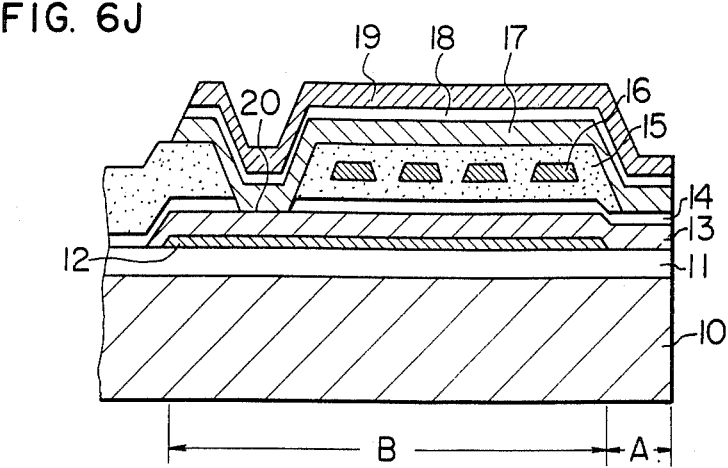
Figure 6K:
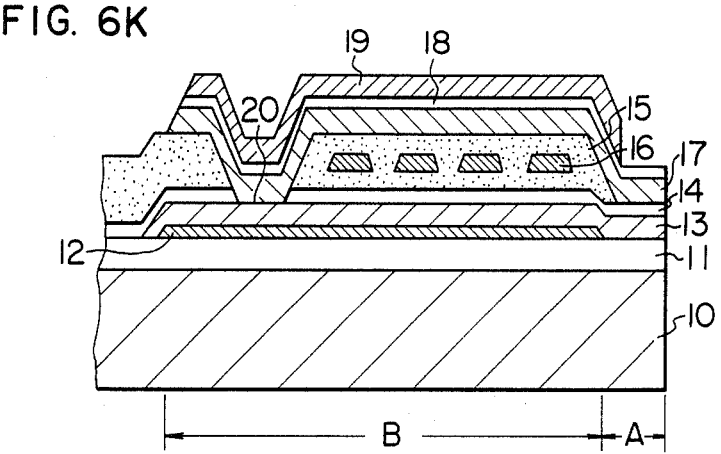
FIG. 6K is a longitudinal sectional view showing a resultant thin-film magnetic head in accordance with one embodiment of the invention.

There is shown in FIG. 6K a longitudinal sectional view of a resultant thin-film magnetic head in accordance with one embodiment of the present invention in which a right side portion designates a surface opposed to a recording medium. This thin film magnetic head comprises the following elements: an under-film 11 made of alumina ($Al_2O_3$), etc. formed on a substrate 10 made of ceramic, etc.; a magnetic film 12 of permalloy (Ni-Fe) formed thereon, the portion thereof corresponding to a pole chip region A of a core being removed; a magnetic film 13 of permalloy formed to entirely cover the magnetic film 12 as well as the pole chip region, in which the film thickness is larger at a back region B than at the pole chip region (a magnetic gap region); a magnetic gap film 14 made of the alumina, etc. formed on the magnetic film 13; an inter-layer insulating film 15 of organic resin formed on the magnetic gap film; a conductor coil 16 of Cu, Al, etc. formed in the inter-layer insulating film 15; a magnetic film 17 of permalloy formed on the inter-layer insulating film 15, which is connected with the magnetic film at a back region 20; an inorganic insulating film 18 formed on the magnetic film 17; and a magnetic film 19 of permalloy formed on the inorganic insulating film 18, the portion corresponding to the magnetic gap region A being removed. in this thin-film magnetic head, there are provided a magnetic circuit of closed loop in which the upper and lower magnetic films 17 and 13 are connected to each other at the back region 20, and magnetic gap in which the upper and lower magnetic films 17 and 13 are exposed to the magnetic gap film 14.

Figure 3A:
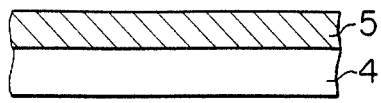
Figure 3B:
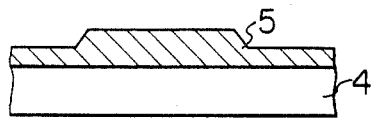
Figure 3C:
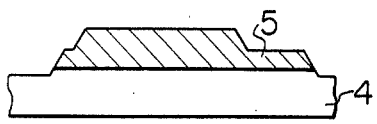
Figure 5:
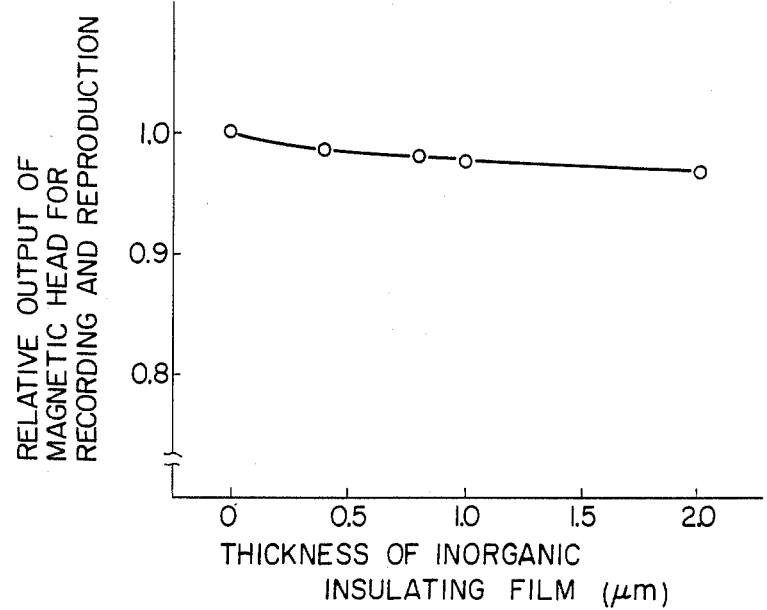
FIG. 5 is a graph showing a relation between a thickness of an inorganic insulating film and an output of a magnetic head.
Figure 4A:
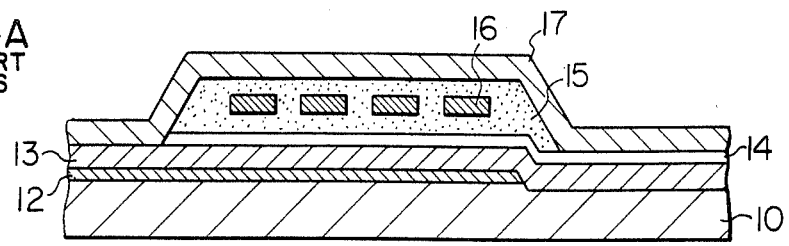
FIGS. 4A to 4D are longitudinal sectional views which illustrate processes of fabricating a magnetic head on a substrate according to a conventional technique.
Figure 4B:
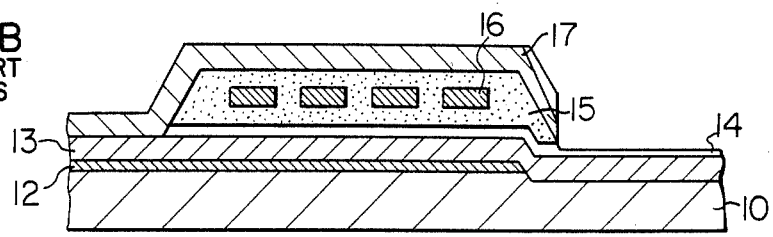
Figure 4C:
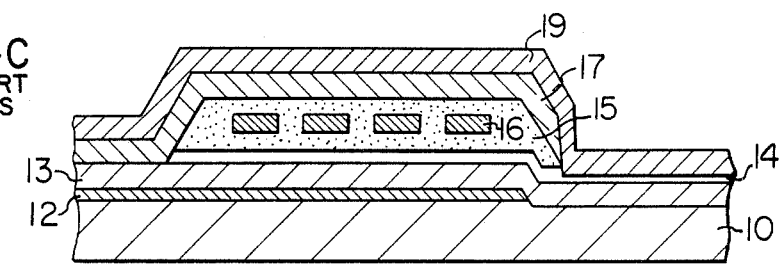
Figure 4D:
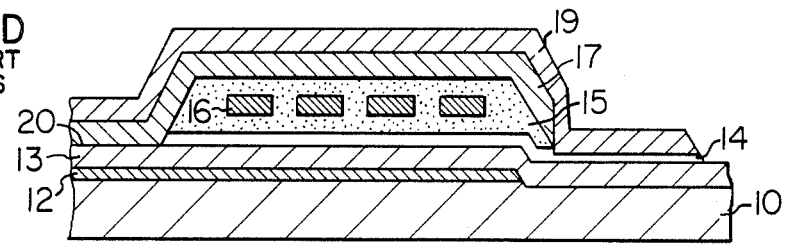

According to such a structure, in case where the uppermost magnetic film 19 is intended to be removed to obtain a predetermined magnetic film thickness at the magnetic gap region A, the film thickness of the magnetic film 17 remains unvaried since the inorganic insulating film 18 functions to prevent the magnetic film from being etched (etching stopper). And the magnetic film thickness at the back region B is larger than that at the magnetic gap region A, which constitutes a double step structure. Meanwhile, since the inorganic insulating film 18 divides an upper magnetic core into the magnetic film 17 and magnetic film 19, the magnetic performance of the entire core appears to degrade. However, any serious problem does not occur actually since, as shown in FIG. 5, the increase of the film thickness of the inorganic insulating film 18 to about 2 $\mu m$ results in only a slight output reduction for recording and reproduction. Incidentally, the thickness of the inorganic insulating film necessary to etch a permalloy film being 2 $\mu m$ thick is about 0.3-0.6 $\mu m$. FIG. 5 is a graph which indicates a film thickness of an inorganic insulating film in the abscissa and a relative output of a magnetic head for recording and reproduction in the ordinate.

Thus, there is obtained a thin-film magnetic head composed of a magnetic gap region where the magnetic film is of predetermined film thickness of enhance the resolution for reproduction and a back region where the magnetic film is thicker than that at the magnetic gap region to relax the magnetization saturation for recording and increase the conversion efficiency of the head.

Next, a method of fabricating the thin film magnetic head shown in FIG. 6K will be explained in detail referring to FIGS. 6A-6J.

In the first place, alumina is sputtered on the substrate 10 of ceramic, etc. to form the the under-film 11 (FIG. 6A). Permalloy (Ni-Fe alloy) is stacked on the under-film 11 through sputtering, a photoresist mask is formed thereon, thereafter the magnetic film 12 is patterned through dry etching technique such as ion-milling and sputter etching with the film portion corresponding to the pole chip region being removed and the photoresist film is eventually removed (FIG. 6B). A magnetic film 13 is formed so as to entirely cover the magnetic film 12 and also extend to the pole chip region in the same manner as in the magnetic film 12 with the result that a first magnetic core has a thicker film at the back region B than at the magnetic gap region A (FIG. 6C). Alumina is sputtered to form a magnetic gap film 14 and the magnetic gap film 14 is partially removed through a dry etching technique thereby to form the contact (back) region 20 of the magnetic film 13 to the upper magnetic core (FIG. 6D). Organic resin PIQ (polyimide isoindroquinazolinedione) is coated to form the inter-layer insulating film 15 (FIG. 6E). Cu, Al, etc. is stacked through sputtering, a photoresist film is formed thereon, and thereafter the conductor coil 16 is patterned by a dry etching technique with the photoresist film being removed (FIG. 6F). PIQ is coated on the resultant surface to fill up the grooves among the conductors of the conductor coil 16, the inter-layer insulating film 15 is formed again to be flat on the conductor coil 16 and thereafter the PIQ at the contact region 20 to the upper magnetic core is removed and the entire inter-layer insulating film is patterned by chemical etching (FIG. 6G). Permalloy is stacked on the resultant surface through sputtering and the magnetic film 17 is patterned by the dry etching technique mentioned above (FIG. 6H). This magnetic film 17 is formed to cover the magnetic gap region A and to be connected with the first magnetic core at the back region (contact region) 20. Inorganic insulator is sputtered to form the inorganic insulating film 18 (FIG. 6I). Metal oxide such as alumina ($Al_2O_3$), titania ($TiO_2$), etc or metal nitride is most preferably employed as an inorganic insulator since these materials have the property of slow and stable etching speed during dry etching. The inorganic insulating film 18 can also be patterned in such a manner that the inorganic insulating film is stacked subsequently to the magnetic film 17 in the same vacuum vessel. Permalloy is stacked on the resultant surface to form the magnetic film 19 through sputtering (FIG. 6J). This magnetic film 19 is patterned so that the film at the pole chip region is removed by dry-etching the photoresist mask aligned with a predetermined interval from the surface opposed to the recording medium and removing it (FIG. 6K). The magnetic film 17, the inorganic insulating film 18 and the magnetic film 19 can also be successively stacked in the same vacuum vessel and successively etched in the same manner as mentioned above. This manner is meritorious in that it enables continuous stacking of film, provides less remainder to be etched for forming each film and provides a desired width for each film. Thus, the thin-film magnetic head is accomplished. In case where the portion of the magnetic film 19 corresponding to the pole chip region is etched, the thickness of the magnetic film 17 remains unvaried since the inorganic insulating film 18 acts as "an etching stopper" for the magnetic film 17. The required thickness of the inorganic insulating film 18 for purpose of acting as an etching stopper is such that a non-uniform etching time is presented when the magnetic film 19 is etched. For example, when a 2 μm permalloy film is to be etched by ion-milling, a thickness of about 0.3–0.6 μm is required if alumina is employed as an inorganic insulating film.

Incidentally, when the present invention is put into practice, the inorganic insulating film is exposed to the surface opposed to the recording medium in a magnetic head. However, a problem does not occur since the property such as resistance to crashing which is serious to a floating type magnetic head is kept by using such a stable oxide as alumina as the inorganic insulating film. Further the degradation of magnetic performance of an upper magnetic core is less despite the provision of the inorganic insulating film as seen from FIG. 5.

While the invention has been particularly shown and described with reference to preferred embodiments, it will be understood by those skilled in the art that various changes and modifications can be made without departing from the spirit and scope of the invention.

We claim:

1. A thin-film magnetic head having a magnetic core of double step structure comprising:
   a substrate;
   a first magnetic core formed on the substrate which has a predetermined thickness at a pole chip region thereof and a thickness larger than the predetermined thickness at a back region thereof;
   a magnetic gap film formed on the first magnetic core;
   a conductor coil formed over the magnetic gap film, which is encircled by an inter-layer insulating film; and
   a first magnetic film formed on the inter-layer insulating film and connected with the first magnetic core at the back region; an insulating film formed on the first magnetic film; and a second magnetic film formed on the insulating film, and removed at the pole chip region, said first and second magnetic films constituting a second magnetic core.

2. A thin-film magnetic head according to claim 1, wherein said inter-layer insulating film is made of organic resin.

3. A thin-film magnetic head according to claim 1, wherein said insulating film is made of an insulator having slow etching speed.

4. A thin-film magnetic head according to claim 2, wherein said insulating film is made of an insulator having slow etching speed.

5. A thin-film magnetic head according to claim 3, wherein said insulating film is an inorganic insulator selected from the group consisting of a metal oxide and a metal nitride.

6. A thin-film magnetic head according to claim 4, wherein said insulating film is an inorganic insulator selected from the group consisting of a metal oxide and a metal nitride.

7. A thin-film magnetic head according to claim 5, wherein said inorganic insulator is alumina or titania.

8. A thin-film magnetic head according to claim 6, wherein said inorganic insulator is alumina or titania.

9. A method of fabricating a thin-film magnetic head having a magnetic core of double step structure comprising the steps of:
   forming a first magnetic core on a substrate, said first magnetic core having a predetermined thickness at a pole chip region thereof and a thickness larger than the predetermined thickness at a back region thereof;
   forming a magnetic gap film formed on the first magnetic core;
   forming a conductor coil over the magnetic gap film, which is encircled by an inter-layer insulating film;
   forming a first magnetic film on the inter-layer insulating film, which is connected with the first magnetic core at the back region;
   forming an insulating film on the first magnetic film; and
   forming a second magnetic film on the insulating film, which is removed at the pole chip region, said first and second magnetic films constituting a second magnetic core.

10. A method of fabricating a thin-film magnetic head having a magnetic core of double step structure comprising the steps of:
    forming an under-film on a substance;
    forming a first magnetic film on the under-film;
    removing the first magnetic film at the pole chip region;
    forming a second magnetic film so as to cover the first magnetic film and to extend to the said pole chip region;
    forming a magnetic gap film on the second magnetic film;
    forming an exposed region of the second magnetic film on said magnetic gap film at the back region;
    forming an inter-layer insulating film on the magnetic gap film;
    forming a conductor coil on the inter-layer film;
    forming another inter-layer insulating film to cover the conductor coil;
    removing a part of the inter-layer insulating film corresponding to said exposed region;
    forming a third magnetic film on the inter-layer insulating film, which is connected with the second magnetic film at the exposed region;
    forming an inorganic insulating film on the third magnetic film;

forming a fourth magnetic film on the inorganic insulating film; and removing the fourth magnetic film at the pole chip region.

11. A method according to claim 9, wherein said second magnetic core and the insulating film intervening therein are subjected to successive film formation and patterning.

12. A method according to claim 10, wherein said third magnetic film, said inorganic insulating film and said fourth magnetic film are subjected to successive film formation and patterning.

13. A method according to claim 9, wherein said inter-layer insulating film is made of organic resin.

14. A method according to claim 10, wherein said inter-layer insulating film is made of organic resin.

15. A method according to claim 11, wherein said inter-layer film is made of organic resin.

16. A method according to claim 12, wherein said inter-layer insulating film is made of organic resin.

17. A method according to claim 9, wherein said insulating film is of an insulator having low etching speed.

18. A method according to claim 11, wherein said insulating film is of an insulator having low etching speed.

19. A method according to claim 17, wherein said insulator is of an inorganic insulator selected from the group consisting of a metal oxide and metal nitride.

20. A method according to claim 18, wherein said insulator is of an inorganic insulator selected from the group consisting of a metal oxide and metal nitride.

21. A method according to claim 19, wherein said inorganic insulator is of alumina or titania.

22. A method according to claim 20, wherein said inorganic insulator is of alumina or titania.

23. A method according to claim 10, wherein said inorganic insulating film is of an inorganic insulator selected from the group consisting of a metal oxide and metal nitride.

24. A method according to claim 12, wherein said inorganic insulating film is of an inorganic insulator selected from the group consisting of a metal oxide and metal nitride.

25. A method according to claim 23, wherein said inorganic insulator is of alumina or titania.

26. A method according to claim 24, wherein said inorganic insulator is of alumina or titania.

* * * * *

UNITED STATES PATENT AND TRADEMARK OFFICE
CERTIFICATE OF CORRECTION

PATENT NO. : 4,550,353
DATED : October 29, 1985
INVENTOR(S) : Hirai et al.

It is certified that error appears in the above-identified patent and that said Letters Patent is hereby corrected as shown below:

Title page, left-hand column:

"[73] Assignee: Computer Basic Technology Research, Tokyo, Japan"

should read:

--[73] Assignee: Computer Basic Technology Research Association, Tokyo, Japan--

Signed and Sealed this

Eighteenth Day of February 1986

[SEAL]

Attest:

DONALD J. QUIGG

Attesting Officer

Commissioner of Patents and Trademarks